(12) United States Patent
Gady et al.

(10) Patent No.: US 6,991,571 B2
(45) Date of Patent: Jan. 31, 2006

(54) VARIABLE RATIO DRIVE SYSTEM

(75) Inventors: Richard Gady, Rochester Hills, MI (US); Timothy Boothby, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 21 days.

(21) Appl. No.: 10/731,536

(22) Filed: Dec. 9, 2003

(65) Prior Publication Data

US 2005/0124450 A1    Jun. 9, 2005

(51) Int. Cl.
   *F16H 3/72*      (2006.01)
(52) U.S. Cl. .......................................... 475/5
(58) Field of Classification Search ................... 475/5, 475/6, 9
   See application file for complete search history.

(56) References Cited

U.S. PATENT DOCUMENTS 5,558,588 A * 9/1996 Schmidt ................. 475/5
6,468,175 B1 * 10/2002 Lehongre ................. 475/5

* cited by examiner

*Primary Examiner*—Dirk Wright
(74) *Attorney, Agent, or Firm*—Carlson, Gaskey & Olds

(57) ABSTRACT

A drive system for a vehicle utilizes a series of drive motors and a single planetary gear box to provide driving input to a differential for an axle assembly. The differential drives a pair of axle shafts that drive a pair of laterally spaced wheels. The planetary gear box includes a sun gear, a plurality of planet gears in meshing engagement with the sun gear, a planet carrier that supports the planet gears, and a ring gear that is in meshing engagement with the planet gears. One drive motor drives the sun gear and another drive motor drives the ring gear. The planet carrier provides the output driving force from the planetary gear box to the differential. The motor that drives the sun gear provides for high output torque by taking advantage of a high gear ratio reduction and the motor that drives the ring gear provides for high output speed by taking advantage of a low gear ratio reduction. When both motors are simultaneously powered, a variable gear ratio is provided.

23 Claims, 2 Drawing Sheets

VARIABLE RATIO DRIVE SYSTEM

BACKGROUND OF THE INVENTION

The subject invention relates to a variable ratio drive system for a vehicle that utilizes a series of drive motors in combination with a single planetary gear box to provide driving input to an axle differential.

Electric drive motor systems for a vehicle drive axle assembly typically do not have the capability to efficiently control the complete range of torque and speed requirements of a wheel driven vehicle. Heavy duty vehicles, such as trucks and buses for example, require a wide range of torque and speeds to accommodate the often strenuous and diverse duty cycles to which these types of vehicles are subjected. Traditionally, in order to accommodate these torque and speed range requirements, either a complex transmission is required or a large capacity variable speed electric motor must be used as a power source. Either of these solutions is expensive. A further disadvantage is that this large capacity power source has to use a conventional axle gear differential to transfer the torque to driving wheels on the axle assembly, and the combination of a conventional differential and large capacity power source is difficult to install within the available packaging space.

One proposed solution has been to utilize independent motor drives at each wheel. This requires a separate power source and drive gear set at each wheel. This configuration eliminates the need for a conventional differential, however, the use of a motor and drive gears for each powered wheel significantly increases system costs.

Thus, there is a need for a variable ratio drive motor configuration for an axle assembly that provides for a wide range of operational torques and speeds. This motor configuration should be easily incorporated into an axle having a differential assembly as well as overcoming the other above-mentioned deficiencies in the prior art.

SUMMARY OF THE INVENTION

A drive axle assembly with a differential is powered with a series of drive motors. The drive motors are operably coupled to drive a planetary gear set that in turn drives the differential. The combination of the drive motors and planetary gear set provide a variable ratio drive system.

In one disclosed embodiment, the drive axle assembly includes a center differential assembly that drives a pair of axle shafts. The axle shafts drive laterally spaced wheels. The planetary gear set is operably coupled to the differential assembly and includes a sun gear, a plurality of planet gears in meshing engagement with the sun gear, a planet carrier that supports the planet gears, and a planetary ring gear that is in meshing engagement with the planet gears. A first drive motor drives the sun gear and a second drive motor drives the ring gear. The planet carrier comprises an output to the differential assembly. The first drive motor provides high output torque that is necessary for acceleration by taking advantage of a high gear ratio reduction. The second drive motor provides for high output speed capabilities by taking advantage of a low gear ratio reduction. The gear ratio is variable when the first and second drive motors are used in conjunction with each other.

In one disclosed embodiment, the differential assembly includes an input pinion and ring gear. The planet carrier is directly coupled to the pinion gear. The pinion gear drives the ring gear, which is attached to the differential assembly. The differential assembly drives the axle shafts, which rotate about a common lateral axis of rotation. The first and second drive motors include output shafts that rotate about first and second longitudinal axes of rotation. The first and second longitudinal axes of rotation are transverse to the lateral axis of rotation.

In another disclosed embodiment, the planet carrier directly drives the differential assembly. The differential assembly drives the axle shafts, which rotate about a common lateral axle axis of rotation. In this configuration, the first and second drive motors include output shafts that rotate about first and second lateral motor axes of rotation. The first and second lateral motor axes of rotation are parallel to and spaced apart from the lateral axle axis of rotation.

The subject system provides a variable drive system that utilizes a series of drive motors in combination with a single planetary gear set that drives a differential assembly. The subject invention eliminates the need for a large capacity variable speed motor and/or a complex transmission system. Further, the subject drive system is easily incorporated into existing drive axle designs. These and other features of the present invention can be best understood from the following specification and drawings, the following of which is a brief description.

DETAILED DESCRIPTION OF THE PREFERRED EMBODIMENT

Figure 1:
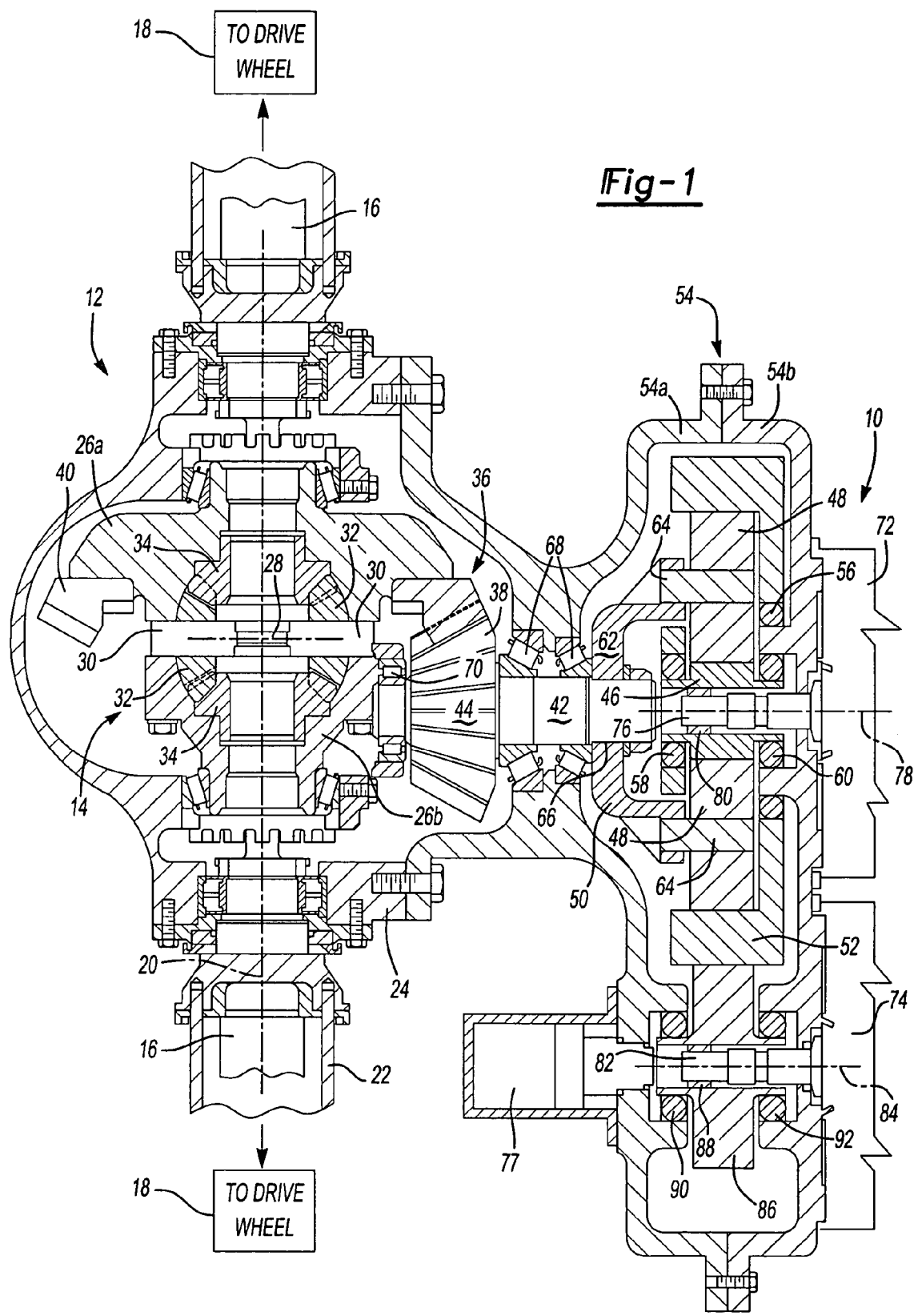
FIG. 1 shows a cross-sectional view, partially broken away, of a drive axle assembly incorporating the subject invention.

A variable ratio drive system is generally shown at 10 in FIG. 1. The drive system 10 powers a drive axle assembly 12 for a vehicle (not shown). The drive axle assembly 12 includes a center differential 14 that is operably coupled to first and second axle shafts 16. The axle shafts 16 drive a pair of laterally spaced vehicle wheels 18 about a lateral axis of rotation 20. The axle shafts 16 are substantially enclosed within an axle housing 22. The differential 14 is substantially enclosed within a carrier housing 24 that is formed as part of the axle housing 22, or bolted to or otherwise attached to, the axle housing 22.

The differential 14 includes first and second differential case halves 26a, 26b that are bolted together. The first and second differential case halves 26a, 26b support a differential spider 28. The differential spider 28 is shaped like a cross, i.e. the differential spider has four (4) leg portions 30 (only two (2) are shown). Each leg portion 30 supports a differential pinion gear 32. Thus, there are four (4) differential pinion gears 32 in the differential 14 (only two (2) are shown). The differential pinion gears 32 are in meshing engagement with first and second side gears 34. The first and second side gears 34 are splined to the first and second axle shafts 16, respectively. The differential case halves 26a, 26b, differential pinion gears 32, and sides gears 34 cooperate to provide for speed differentiation between the axle shafts 16 under predetermined conditions. For example, if the vehicle is maneuvering through a turn, the outside wheel must turn at a faster rotational speed than the inside wheel. The operation of a differential is well-known in the art and will not be discussed in any further detail.

An input assembly 36 is operably coupled to drive the differential 14. In the embodiment shown in FIG. 1, the input assembly 36 includes a pinion gear 38 and a ring gear 40. The ring gear 40 is preferably bolted to one of the first or second differential case halves 26a, 26b. The pinion gear 38 includes a pinion shaft portion 42 and a gear portion 44 with a plurality of pinion teeth. The pinion teeth are in meshing engagement with ring gear teeth to drive the ring gear 40.

A single planetary gear set provides the driving input to the input assembly 36. The planetary gear set includes a sun gear 46, a plurality of planet gears 48 in meshing engagement with the sun gear 46, a planet carrier 50 that supports the planet gears 48, and a planetary ring gear 52 that is in meshing engagement with the planet gears 48. Preferably, the planetary gear set includes at least three planet gears 48 (only two (2) are shown in the cross-sectional view of FIG. 1), however, additional planet gears 48 could also be incorporated into the planetary gear set.

The planetary gear set also includes a gear housing 54. In one disclosed embodiment, the gear housing 54 includes a first housing half 54a bolted, or otherwise similarly attached to, the carrier housing 24 or axle housing 22, and a second housing half 54b bolted, or otherwise similarly attached to, the first housing half 54a. The planetary ring gear 52 is rotatably supported on a first bearing assembly 56. The first bearing assembly 56 is preferably positioned between a flange portion on the second housing half 54b and an inner circumferential portion of the planetary ring gear 52. The sun gear 46 is rotatably supported by second 58 and third 60 bearing assemblies positioned on either side of the sun gear 46. Preferably, the second bearing assembly 58 is positioned between the first housing half 54a and a first end of the sun gear 46 and the third bearing assembly 60 is positioned between the second housing half 54b and a second end of the sun gear 46.

The planet carrier 50 includes a main body portion 62 defining a center opening that receives the pinion shaft portion 42 of the pinion gear 38. Each of the planet gears 48 is rotatably supported on a planet pin 64 that is fixed to the planet carrier 50. The planet carrier 50 directly drives the pinion gear 38 via a splined connection 66 between the center opening and pinion shaft portion 42. The pinion gear 38 is supported by first set of bearings 68 positioned between the pinion shaft portion 42 and the first housing half 54a and by a spigot bearing 70 positioned on an opposite side of the pin gear portion 44 from the first set of bearings 68. The spigot bearing 70 is positioned between one of the first or second differential case halves 26a, 26b and the pinion gear 38. Preferably one bearing from the first set of bearings 68 abuts against the main body portion 62 of the planet carrier 50.

A series of drive motors are used to power the planetary gear set. A first drive motor 72 drives the sun gear 46 and a second drive motor 74 drives the planetary ring gear 52. The planet carrier 50 provides the driving output as discussed above. The first drive motor 72 provides a high output torque capability necessary for acceleration by taking advantage of a high gear ratio reduction. Thus, the first drive motor 72 serves as the primary driver from a vehicle start. This high torque output is applied to the ring gear 52. The second drive motor 74, which drives the ring gear 52, resists this torque. A lock-up clutch 77 is automatically actuated to hold the ring gear 52 in place, i.e. the clutch 77 prevents the ring gear 52 from rotating during starts. Once the vehicle reaches a predetermined minimum speed, the lock-up clutch 77 is released and the second drive motor 74 is permitted to drive the ring gear 52 to provide the variable ratio output. This predetermined minimum speed can vary depending on vehicle application, however, as an example, a minimum speed of five miles per hour could be used.

The second drive motor 74 can also solely drive the planet gear set under certain predetermined conditions. The first drive motor 72 would preferably not be required to be locked out, but would be required to at least slow down in order to achieve driving output only from the second drive motor 74.

The second drive motor 74 provides a high output speed capability for highway speed operation by taking advantage of a low gear ratio reduction. The gear ratio is variable when both the first 72 and second 74 drive motors are used in conjunction with each other. Any combination of gear ratios known in the art could be used. The selection of gear ratios varies depending on the type of vehicle application and the size of the drive motors. The drive motors 72, 74 can be electric or hydraulic drive motors.

The first drive motor 72 includes a first motor output shaft 76 that rotates about a first motor axis of rotation 78. Preferably, the first motor output shaft 76 is directly coupled to the sun gear 46. The sun gear 46 includes a center opening that receives the first motor output shaft 76. A connection 80 between the sun gear 46 and the first motor output shaft 76 at the center opening transfers the driving power from the first drive motor 72 to the sun gear 46. The connection 80 can be a splined connection or any other connection method or apparatus known in the art.

The second drive motor 74 includes a second motor output shaft 82 that rotates about a second motor axis of rotation 84. Preferably, the second motor output shaft 82 is coupled to a drive gear 86, which in turn drives the ring gear 52. The drive gear 86 includes a center opening that receives the second motor output shaft 82. A connection 88 between the drive gear 86 and the second motor output shaft 82 at the center opening transfers the driving power from the second drive motor 74 to the drive gear 86. The connection 88 can be a splined connection or any other connection method or apparatus known in the art. Thus, the second drive motor 74 indirectly drives the ring gear 52 via the drive gear 86. The drive gear 86 is supported by first 90 and second 92 bearings. The first bearing 90 is positioned between the first housing half 54a and the drive gear 86 and the second bearing 92 is positioned between the second housing half 54b and the drive gear 86.

In the configuration shown in FIG. 1, the first 78 and second 84 motor axes of rotation extend in a longitudinal direction. The first 78 and second 84 motor axes of rotation are transversely orientated relative to the lateral axis of rotation 20 about which the axle shaft 16 and wheels 18 rotate. This configuration is preferred as the planetary gear set and associated first 72 and second 74 drive motors are easily incorporated into a standard drive axle configuration with a ring gear 40 and pinion gear 38 input to the differential 14.

Figure 2:
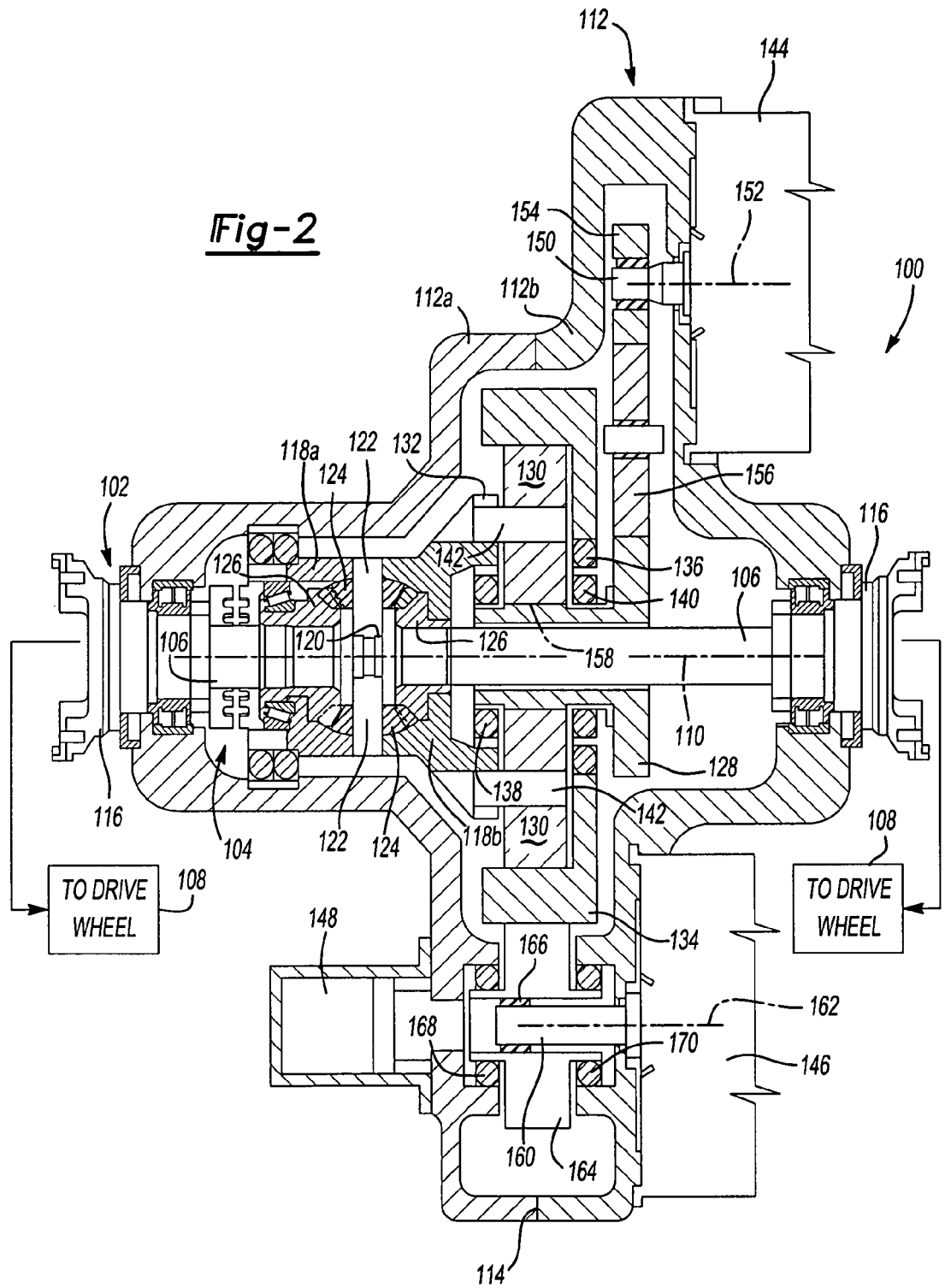
FIG. 2 shows a cross-sectional view, partially broken away, of an alternate embodiment of a drive axle assembly incorporating the subject invention.

FIG. 2 shows an alternate embodiment of a variable ratio drive system 100 for a drive assembly 102. This variable ratio drive system 100 operates in a similar manner to the system described above with regard to FIG. 1, however, this configuration includes a different differential, a different planetary gear set configuration, and a different drive motor orientation. The drive assembly 102 of FIG. 2 includes a center differential 104 that is operably coupled to first and second axle shafts 106. The axle shafts 106 drive a pair of laterally spaced vehicle wheels 108 about a lateral axis of rotation 110.

In the configuration shown in FIG. 2, the drive axle assembly 102 is utilized in an independent suspension configuration. In one disclosed embodiment, the differential 104 and axle shafts 106 are substantially enclosed by a gear housing 112 that preferably includes a first housing portion 112a and a second housing portion 112b attached to the first housing portion 112a along a split line 114. The housing portions 112a, 112b can be attached to each other by any method known in the art. The axle shafts 106 are coupled to output flanges 116, which are in turn coupled to shafts (not shown) that drive the wheels 108.

Optionally, the axle shafts 106 could extend to the wheels 108 and be substantially enclosed within a rigid axle housing 22 as shown in FIG. 1. In this configuration, the differential 104 would also be substantially enclosed within the axle housing 22 or enclosed within a carrier housing 24 that is bolted to or otherwise attached to the axle housing 22.

The differential 104 includes first and second differential case halves 118a, 118b that are bolted together. The first and second differential case halves 118a, 118b support a differential spider 120. The differential spider 120 is shaped like a cross, i.e. the differential spider 120 has four (4) leg portions 122 (only two (2) are shown). Each leg portion 122 supports a differential pinion gear 124, Thus, there are four (4) differential pinion gears 124 in the differential 104 (only two (2) are shown). The differential pinion gears 124 are in meshing engagement with first and second side gears 126. The first and second side gears 126 are splined to the first and second axle shafts 106, respectively. The differential case halves 118a, 118b, differential pinion gears 124, and sides gears 126 cooperate to provide for speed differentiation between the axle shafts 106 under predetermined conditions as discussed above.

A planetary gear set provides the driving input to the differential 104. The planetary gear set includes a sun gear 128, a plurality of planet gears 130 in meshing engagement with the sun gear 128, a planet carrier 132 that supports the planet gears 130, and a planetary ring gear 134 that is in meshing engagement with the planet gears 130. Preferably, the planetary gear set includes at least three planet gears 130 (only two (2) are shown in the cross-sectional view of FIG. 2), however, additional planet gears 130 could also be incorporated into the planetary gear set.

The planetary gear set also includes the gear housing 112. The gear housing 112 can include housing portions formed as part of the axle housing or can be formed from a plurality housing portions 112a, 112b that are fastened or other wise attached to an axle housing that surrounds the shafts extending to the wheels 108. The planetary ring gear 134 is rotatably supported on a first bearing assembly 136. The first bearing assembly 136 is preferably positioned between the gear housing 112 and an inner circumferential portion of the planetary ring gear 134. The sun gear 128 is rotatably supported by second 138 and third 140 bearing assemblies positioned on either side of the sun gear 128. Preferably, the second bearing assembly 138 is positioned between the first housing portion 112a and a first end of the sun gear 128 and the third bearing assembly 140 is positioned between the second housing portion 112b and a second end of the sun gear 128.

The planet carrier 132 is attached to one of the differential case halves 118a, 118b. Each of the planet gears 130 is rotatably supported on a planet pin 142 that is fixed to the planet carrier 132. The planet carrier 132 directly drives the differential 104 via the connection between the carrier 132 and the differential case halves 118a, 118b.

A series of drive motors are used to power the planetary gear set. A first drive motor 144 drives the sun gear 128 and a second drive motor 146 drives the ring gear 134. The planet carrier 132 provides the driving output as discussed above. The first drive motor 144 provides a high output torque capability necessary for acceleration by taking advantage of a high gear ratio reduction. Thus, the first drive motor 144 serves as the primary driver from a vehicle start. This high torque output is applied to the ring gear 134. The second drive motor 146, which drives the ring gear 134, resists this torque. A lock-up clutch 148 is automatically actuated to hold the ring gear 134 in place, i.e. the clutch 148 prevents the ring gear 134 from rotating. Once the vehicle reaches a predetermined minimum speed, the lock-up clutch 148 is released and the second drive motor 146 is permitted to drive the ring gear 134 to provide the variable ratio output. This predetermined minimum speed can vary depending on vehicle application, however, as an example, a minimum speed of five miles per hour could be used.

The second drive motor 146 can also solely drive the planet gear set under certain predetermined conditions. The first drive motor 144 would preferably not be required to be locked out, but would be required to at least slow down in order to achieve driving output only from the second drive motor 146.

The second drive motor 146 provides a high output speed capability for highway speed operation by taking advantage of a low gear ratio reduction. The gear ratio is variable when both the first 144 and second 146 drive motors are used in conjunction with each other. Any combination of gear ratios known in the art could be used. The selection of gear ratios varies depending on the type of vehicle application and the size of the drive motors. The drive motors can be electric or hydraulic drive motors.

The first drive motor 144 includes a first motor output shaft 150 that rotates about a first motor axis of rotation 152. In the configuration shown in FIG. 2, the first motor output shaft 150 is operably coupled to a drive gear 154, which is in meshing engagement with an idler gear 156. The idler gear 156 drives the sun gear 128. The sun gear 128 includes a center opening through which a portion of one of the axle shafts 106 extends and includes a outer toothed portion 158 that drives the planet gears 130. Thus, the first drive motor 144 indirectly drives the sun gear 128 via the drive gear 154 and the idler gear 156.

The second drive motor 146 includes a second motor output shaft that 160 rotates about a second motor axis of rotation 162. Preferably, the second motor output shaft 160 is coupled to a drive gear 164, which in turn drives the ring gear 134. The drive gear 164 includes a center opening that receives the second motor output shaft 160. A connection 166 between the drive gear 164 and the second motor output shaft 160 at the center opening transfers the driving power from the second drive motor 146 to the drive gear 164. The connection 166 can be a splined connection or any other connection method or apparatus known in the art. Thus, the second drive motor 146 indirectly drives the ring gear 134 via the drive gear 164. The drive gear 164 is supported by first 168 and second 170 bearings. The first bearing 168 is positioned between the first housing portion 112a and the drive gear 164 and the second bearing 170 is positioned between the second housing portion 112b and the drive gear 164.

In the configuration shown in FIG. 2, the first 152 and second 162 motor axes of rotation extend in a lateral direction. The first 152 and second 162 motor axes of rotation are generally parallel to the lateral axis of rotation 110 about which the axle shafts 106 and wheels 108 rotate.

The subject invention provides a variable ratio drive system that utilizes a series of drive motors in combination with a single planetary gear set to provide driving power to a standard drive axle with a differential. This combination achieves the benefits of using and electric or hydraulic motor drive without requiring expensive, complex transmissions or large capacity variable speed electric motors. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle drive system comprising:
   a differential assembly;
   a planetary gear box operably coupled to said differential assembly, said planetary gear box including a first drive member and a second drive member;
   a first power source operably coupled to said first drive member to provide a first gear ratio reduction; and
   a second power source operably coupled to said second drive member to provide a second gear ratio reduction different than said first gear ratio reduction wherein said first and said second power sources selectively drive said first and second drive members together to generate a variable gear ratio under predetermined conditions and wherein said first and said second power sources each comprise one of a hydraulic drive motor and an electric drive motor.

2. The vehicle drive system of claim 1 wherein said first and said second power sources operate independently from each other.

3. The vehicle drive system of claim 2 wherein said first gear ratio reduction is higher than said second gear ratio reduction and wherein under predetermined conditions said first drive member comprises a sole drive member and said first power source operates to generate a high output torque via said first gear ratio reduction by driving said first drive member.

4. The vehicle drive system of claim 2 wherein said second gear ratio reduction is lower than said first gear ratio reduction and wherein under predetermined conditions said second drive member comprises a sole drive member and said second power source operates to generate a high output speed via said second gear ratio reduction by driving said second drive member.

5. The vehicle drive system of claim 1 wherein said differential assembly is mounted within an axle housing and wherein said planetary gear box includes a sun gear, a plurality of planet gears in meshing engagement with said sun gear, a planet carrier supporting said plurality of planet gears, a ring gear in meshing engagement with said plurality of planet gears, and a gear housing substantially enclosing said sun gear, said planet carrier, said ring gear, and said plurality of planet gears, said gear housing being attached to the axle housing, wherein said sun gear comprises said first drive member, said ring gear comprises said second drive member, and said planet carrier comprises a driven member for driving said differential assembly, said driven member being driven by both said first and said second drive members.

6. The vehicle drive system of claim 5 including an input operably coupled to said differential assembly and driven by said planet carrier.

7. The vehicle drive system of claim 6 wherein said input comprises a pinion gear directly driven by said planet carrier and a second ring gear operably coupled to said differential assembly and driven by said pinion gear.

8. The vehicle drive system of claim 7 wherein said first power source directly drives said sun gear.

9. The vehicle drive system of claim 7 including an output gear driven by said second power source wherein said output gear drives said ring gear.

10. The vehicle drive system of claim 5 wherein said planet carrier directly drives said differential assembly.

11. The vehicle drive system of claim 1 wherein said differential assembly is operably coupled to drive first and second axle shafts about a lateral axis of rotation and wherein said first and said second power sources include first and second output shafts rotating about first and second longitudinal axes of rotation that are transverse to said lateral axis of rotation.

12. The vehicle drive system of claim 1 wherein said differential assembly is operably coupled to drive first and second axle shafts about a lateral axle axis of rotation and wherein said first and second power sources include first and second output shafts rotating about first and said second lateral motor axes of rotation that are parallel to and spaced apart from said lateral axle axis of rotation.

13. The vehicle drive system of claim 5 including a clutch coupled to said ring gear to prevent rotation of said ring gear under predetermined conditions.

14. The vehicle drive system of claim 5 including an input gear set for driving said differential assembly, said input gear set including a pinion gear that is directly driven by said planet carrier.

15. The vehicle drive system of claim 5 wherein said differential assembly includes a differential casing that houses a plurality of differential gears, said planet carrier being fixed to said differential casing.

16. The vehicle drive system of claim 5 including a first drive gear in meshing engagement with said ring gear wherein said first power source includes a first output shaft that drives said sun gear and said second power source includes a second output shaft that drives said first drive gear.

17. The vehicle drive system of claim 16 wherein said first output shaft directly drives said sun gear.

18. The vehicle drive system of claim 16 including a second drive gear that drives an idler gear in meshing engagement with said sun gear wherein said first output shaft drives said second drive gear.

19. A vehicle drive system comprising:
   a differential assembly;
   a planetary gear box operably coupled to said differential assembly, said planetary gear box including a first drive member, a second drive member, and a driven member that is driven by both said first and said second drive members;
   said planetary gear box including a sun gear, a plurality of planet gears in meshing engagement with said sun gear, a planet carrier supporting said plurality of planet gears, and a ring gear in meshing engagement with said plurality of planet gears;
   a first power source operably coupled to said first drive member to provide a first gear ratio reduction; and
   a second power source operably coupled to said second drive member to provide a second gear ratio reduction different than said first gear ratio reduction wherein said first and said second power sources selectively drive said first and said second drive members together to generate a variable gear ratio under predetermined conditions wherein said first drive member comprises said sun gear, said second drive member comprises said ring gear, and said driven member comprises said planet carrier; and wherein said planet carrier directly drives said differential assembly, said differential assembly including a differential housing that supports a plurality of differential gears with said planet carrier being formed as part of said differential housing.

20. A vehicle drive system comprising:

first and second axle shafts operably coupled to drive first and second laterally spaced wheel assemblies about a lateral axis of rotation;

a differential assembly operably coupled to drive said first and said second axle shafts;

a single planetary gear box operably coupled to drive said differential assembly, said single planetary gear box including a sun gear, a plurality of planet gears in meshing engagement with said sun gear, a planet carrier supporting said plurality of planet gears, and a ring gear in meshing engagement with said plurality of planet gears;

a first power source operably coupled to drive said sun gear to provide a high gear ratio reduction, said first power source comprising one of a hydraulic drive motor and an electric drive motor; and a second power source operably coupled to drive said ring gear to provide a low gear ratio reduction, said second power source comprising one of a hydraulic drive motor and an electric drive motor, wherein said first and said second power sources simultaneously drive said sun gear and said ring gear to generate a variable gear ratio under predetermined conditions.

21. The vehicle drive system of claim 20 wherein said planet carrier drives said differential assembly and is driven by said sun gear and said ring gear via said plurality of planet gears.

22. A method for powering a vehicle drive system comprising the steps of:

(a) providing a drive axle assembly including a center differential operably coupled to drive first and second axle shafts, and providing a planetary gear box operably coupled to the center differential and including a first drive input member, a second drive input member different than the first drive input member; and an output member driven by both the first and the second drive input members;

(b) driving the first drive input member with a first power source to provide a first gear ratio reduction;

(c) driving the second drive input member with a second power source different than the first power source to provide a second gear ratio reduction different than the first gear ratio reduction wherein the first and second power sources each comprise one of a hydraulic drive motor and an electric drive motor; and (d) simultaneously powering both the first and the second power sources under predetermined conditions to provide a variable gear ratio input to the center differential via the output member.

23. The method of claim 22 wherein the planetary gear box comprises a sun gear, a plurality of planet gears in meshing engagement with the sun gear, a planet carrier supporting the plurality of planet gears, and a ring gear in meshing engagement with the plurality of planet gears, wherein the first drive member comprises the sun gear, the second drive member comprises the ring gear, and the driven member comprises the planet carrier; and including the step of coupling a clutch to the ring gear to prevent rotation of the ring gear under predetermined conditions.

* * * * *